(12) United States Patent
Seol et al.

(10) Patent No.: US 11,499,074 B2
(45) Date of Patent: Nov. 15, 2022

(54) ECO-FRIENDLY ADHESIVE COATING AGENT COMPOSITION FOR STEEL PIPE USING INTERMEDIATE FOR STRUCTURAL ADHESIVE

(71) Applicant: SAERONTECH CO., LTD., Busan (KR)

(72) Inventors: Tae Yoon Seol, Busan (KR); Dong Soo Kim, Busan (KR); Dong Won Lee, Gimhae-si (KR)

(73) Assignee: SAERONTECH CO., LTD.

( * ) Notice: Subject to any disclaimer, the term of this patent is extended or adjusted under 35 U.S.C. 154(b) by 367 days.

(21) Appl. No.: 16/886,997

(22) Filed: May 29, 2020

(65) Prior Publication Data

US 2021/0371716 A1 Dec. 2, 2021

(30) Foreign Application Priority Data

May 26, 2020 (KR) ........................ 10-2020-0063147

(51) Int. Cl.
| | | |
|---|---|---|
| C09J 171/02 | (2006.01) | |
| C09D 171/02 | (2006.01) | |
| C08G 59/14 | (2006.01) | |
| C09J 163/00 | (2006.01) | |
| C09D 163/00 | (2006.01) | |
| C09D 175/04 | (2006.01) | |

(Continued)

(52) U.S. Cl.
CPC ........ *C09J 171/02* (2013.01); *C08G 59/1483* (2013.01); *C08L 75/02* (2013.01); *C08L 75/04* (2013.01); *C08L 81/02* (2013.01); *C09D 163/00* (2013.01); *C09D 171/02* (2013.01); *C09D 175/02* (2013.01); *C09D 175/04* (2013.01); *C09D 181/02* (2013.01); *C09J 163/00* (2013.01); *C08K 13/04* (2013.01); *C08K 2201/014* (2013.01)

(58) Field of Classification Search
CPC .......... C09D 163/00–10; C09D 175/00; C09D 175/02; C09D 175/04; C09D 175/08; C09D 181/02; C08L 63/00–10; C08L 75/00; C08L 75/02; C08L 75/04; C08L 75/08; C08L 81/02; C09J 163/00–10; C09J 175/00; C09J 175/02; C09J 175/04; C09J 175/08; C09J 181/02; C09J 171/02; C08G 59/1483; C08G 59/4064
See application file for complete search history.

(56) References Cited

U.S. PATENT DOCUMENTS 5,143,999 A * 9/1992 Setiabudi ............. C08G 65/326
528/109

* cited by examiner

Primary Examiner — Kregg T Brooks
(74) Attorney, Agent, or Firm — Park & Associates IP Law, P.C.

(57) ABSTRACT

Disclosed is an eco-friendly adhesive coating agent composition having high adhesion properties and fast-curing properties by using a thiol-modified epoxy intermediate. The composition includes: a main material including 25 to 40 parts by weight of polyoxypropyleneamine, 20 to 30 parts by weight of a cross-linking agent, 10 to 30 parts by weight of the thiol-modified epoxy intermediate, 10 to 20 parts by weight of an inorganic filler, 5 to 10 parts by weight of a pigment, and 2 to 5 parts by weight of an additive; and a curing agent including 60 to 80 parts by weight of a rubber-modified epoxy resin, 20 to 40 parts by weight of a polyol, 10 to 30 parts by weight of the thiol-modified epoxy intermediate, and 4 to 10 parts by weight of an additive, with respect to 100 parts by weight of an isocyanate mixture.

5 Claims, 1 Drawing Sheet

(51) Int. Cl.
   *C08L 81/02* (2006.01)
   *C09D 175/02* (2006.01)
   *C09D 181/02* (2006.01)
   *C08L 75/02* (2006.01)
   *C08L 75/04* (2006.01)
   *C08K 13/04* (2006.01)

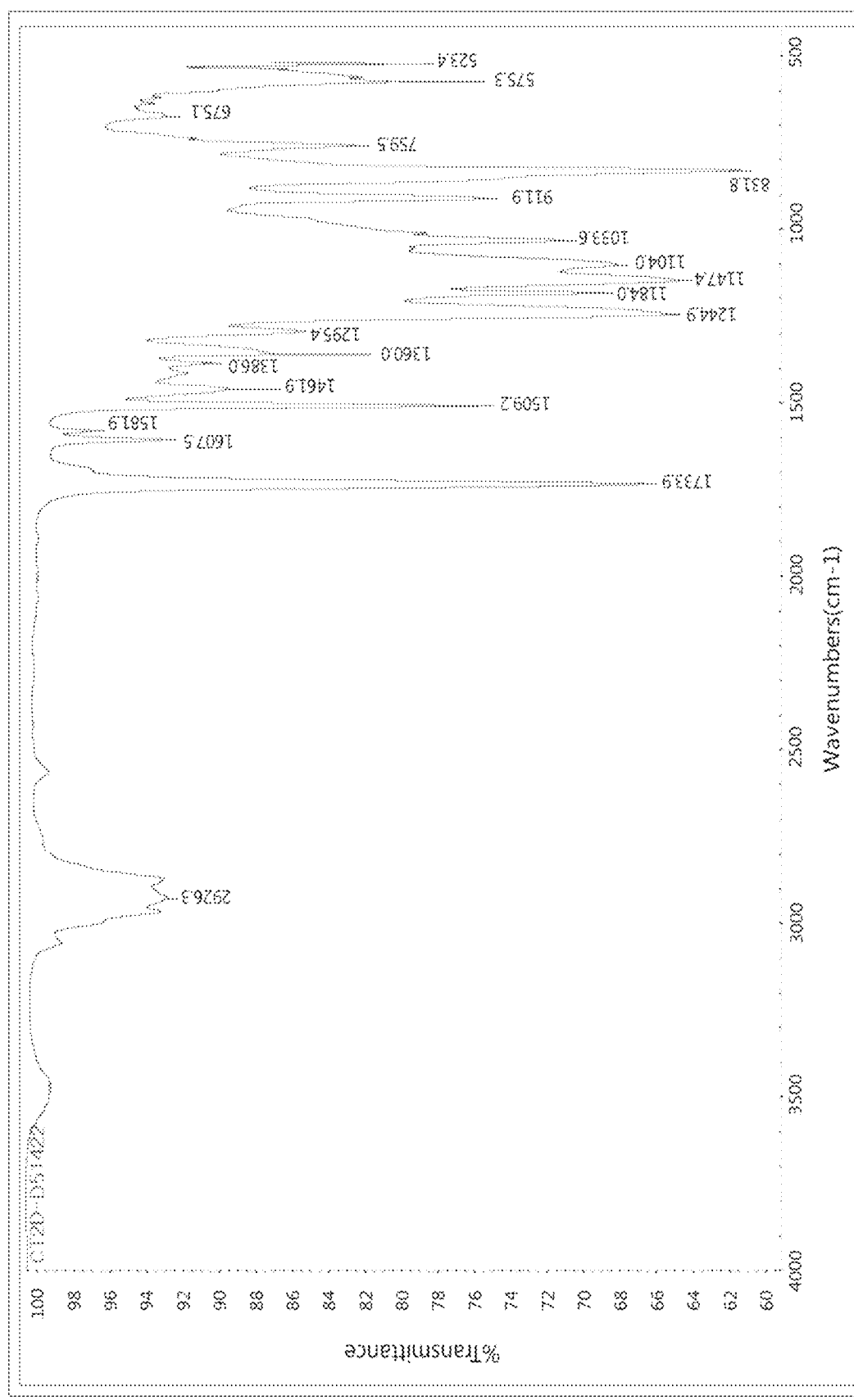

ECO-FRIENDLY ADHESIVE COATING AGENT COMPOSITION FOR STEEL PIPE USING INTERMEDIATE FOR STRUCTURAL ADHESIVE

REFERENCE TO RELATED APPLICATIONS

This application claims the priority benefit of Korean Patent Application No. 10-2020-0063147 filed on May 26, 2020, the entire contents of which are incorporated herein by reference.

FIELD OF THE INVENTION

The present invention relates to an eco-friendly adhesive coating agent composition having fast-curing properties and high adhesion properties by using a thiol-modified epoxy intermediate for a structural adhesive.

BACKGROUND OF THE INVENTION

In general, a coating method using only an epoxy resin requires an operation to apply heat due to slow curing thereof, and bisphenol A and the like included in a coating material for internal coating may remain, which may have a fatal effect to humans. Additionally, impact resistance and bending resistance are weak, and thus there is a high possibility of damage due to impact or partial peeling at a bent portion.

However, epoxy resins are known to have superior physical properties such as tensile strength, mechanical strength, adhesion properties, abrasion resistance, impact resistance, acid resistance, and chemical resistance compared to other types of resins. For this reason, epoxy resins having the above properties are widely used in industrial fields such as ships, civil engineering and building materials, and electrical and electronic materials. However, epoxy resins may be used in combination with a curing agent, such as polyamine or polyamide, rather than being used alone to form a cured coating film by crosslinking, so that physical properties required in various uses of the epoxy resins can be controlled. That is, the coating film formed by the use of the epoxy resins can be controlled in properties in various way not only by the epoxy resins, but also by the curing agent used in combination with the epoxy resins.

In this regard, Korean Patent Application Publication No. 10-2007-0043034 discloses an anticorrosive coating material as a high-solids epoxy-based anticorrosive coating material, wherein a bisphenol A-type liquid epoxy resin, a modified epoxy resin, an acrylate monomer, and the like are used as a main material, and an alicyclic amine curing agent, a Mannich-type curing agent, and the like are used as a curing agent. Further, Korean Patent No. 10-0951645 discloses an epoxy coating material composition including an epoxy curing agent including a polythiol resin prepared by reacting polythiol and carboxylic acid anhydride.

Meanwhile, a coating material coated on the inside or the outside of a steel pipe has to meet characteristics such as water resistance, corrosion resistance, durability, bending resistance, impact resistance, abrasion resistance, and chemical resistance because high pressure, heat, and chemical reactions act. Additionally, the coating film has to meet drinking water standards. In the case of a coating method using an inorganic material and an epoxy resin, there is a disadvantage that curing rate is slow and a manual operation is required. There is also a possibility that durability, impact resistance, and cold resistance may be inferior, which may cause cracking of the coating film, and thus clogging may occur inside the pipe due to such cracking. Further, in the case of a coating method using polyurethane, while adhesion of a coating material is good, curing rate is slow and sensitivity to humidity is high, so that there is a possibility that bubbles may be formed within a coating film. On the other hand, in the case of a coating method using polyurea, while stability to humidity is good, curing rate is too fast and thus airtightness and adhesion to the material are inferior. Additionally, specific gravity is low because an extender pigment (calcium carbonate, barium sulfate, silica, or the like) is not used, and a lot of dust is generated when a coating material is sprayed and applied under conditions of high temperature and high pressure.

Accordingly, in view of the above technical problems, the present inventor has developed an eco-friendly adhesive coating agent composition having fast-curing properties, which is an advantage of polyurea, having excellent mechanical properties, which is an advantage of epoxy resin, and exhibiting high adhesion properties, which significantly improves low adhesion properties, which is a disadvantage of polyurea.

The foregoing is intended merely to aid in the understanding of the background of the present invention, and is not intended to mean that the present invention falls within the purview of the related art that is already known to those skilled in the art.

DOCUMENTS OF RELATED ART (Patent document 1) Korean Patent No. 10-0951645
(Patent document 2) Korean Patent No. 10-0986147

SUMMARY OF THE INVENTION

Accordingly, the present invention has been made keeping in mind the above problems occurring in the related art, and an objective of the present invention is to provide an eco-friendly adhesive coating agent, the adhesive coating agent composition having high adhesion properties and fast-curing properties by using a thiol-modified epoxy intermediate for a structural adhesive.

In order to achieve the above objective, the present invention provides an eco-friendly adhesive coating agent composition having high adhesion properties and fast-curing properties by using a thiol-modified epoxy intermediate, the composition including: a main material including 25 to 40 parts by weight of polyoxypropyleneamine, 20 to 30 parts by weight of a cross-linking agent, 10 to 30 parts by weight of the thiol-modified epoxy intermediate, 10 to 20 parts by weight of an inorganic filler, 5 to 10 parts by weight of a pigment, and 2 to 5 parts by weight of an additive; and a curing agent including 60 to 80 parts by weight of a rubber-modified epoxy resin, 20 to 40 parts by weight of a polyol, 10 to 30 parts by weight of the thiol-modified epoxy intermediate, and 4 to 10 parts by weight of an additive, with respect to 100 parts by weight of an isocyanate mixture, wherein the main material and the curing agent may be mixed in a weight ratio of 1 to 10:1.

Further, in the present invention, the thiol-modified epoxy intermediate may be prepared by reacting 50 to 60 parts by weight of an ethylene glycol-based polyfunctional epoxy resin, 20 to 25 parts by weight of a liquid epoxy resin, and 18 to 25 parts by weight of a thiol compound having at least two terminal thiol groups.

Further, the thiol-modified epoxy intermediate may have the following formula 1:

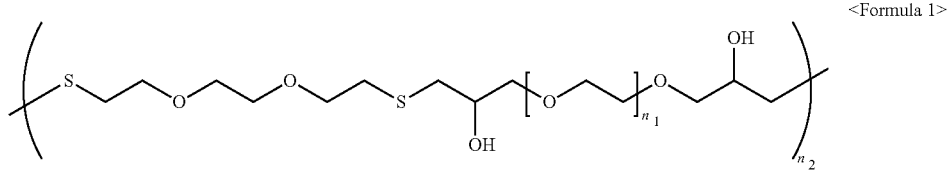

<Formula 1>

(wherein, n1 and n2 may be 1 to 100 respectively in the above formula).

Further, in the present invention, the thiol compound may include at least one selected from 1,2-ethanedithiol, 1,4-butanedithiol, 1,6-hexanedithiol, 2,2'-thiodiethanethiol, 2,2'-(ethylenedioxy) diethanethiol (EDDET), ethane-1,2-diyl bis(3-mercaptopropanoate), hexa(ethylene glycol) dithiol, tetra(ethylene glycol) dithiol, 1,16-hexadecanedithiol, benzene-1,2-dithiol, benzene-1,3-dithiol, benzene-1,4-dithiol, biphenyl-4,4'-dithiol, 1,4-benzenedimethanethiol, and 2-mercaptoethyl ether.

Further, in the present invention, the composition may be a composition for steel pipe coating.

The eco-friendly adhesive coating agent composition according to the present invention described above is characterized by exhibiting high adhesion properties and fast-curing properties by including the thiol-modified epoxy intermediate for a structural adhesive both in the main material and the curing agent. In particular, the eco-friendly adhesive coating agent composition according to the present invention can exhibit excellent fast-curing properties by polyurea bonds; can have a dense network structure by further including the thiol-modified epoxy intermediate for a structural adhesive, resulting in excellent strength and excellent adhesion to a substrate; and can exhibit excellent fast-curing properties even under low temperature conditions, thereby having an excellent effect on steel pipe coating.

BRIEF DESCRIPTION OF THE DRAWINGS

The above and other objectives, features, and other advantages of the present invention will be more clearly understood from the following detailed description when taken in conjunction with the accompanying drawings, in which:

FIG. 1 is a view showing results of FT-IR analysis of a thiol-modified epoxy intermediate according to the present invention.

DETAILED DESCRIPTION OF THE INVENTION

Hereinafter, the present invention will be described in detail.

However, the term 'epoxy equivalent weight' in the present invention may be defined as a molecular weight of an epoxy copolymer per epoxy group.

As one aspect, the present invention relates to an eco-friendly adhesive coating agent composition having high adhesion properties and fast-curing properties by using a thiol-modified epoxy intermediate and is characterized by exhibiting high adhesion properties and fast-curing properties by including the thiol-modified epoxy intermediate for a structural adhesive in both a main material and a curing agent. In detail, the adhesive coating agent composition according to the present invention is characterized by including: the main material including 25 to 40 parts by weight of polyoxypropyleneamine, 20 to 30 parts by weight of a cross-linking agent, 10 to 30 parts by weight of the thiol-modified epoxy intermediate, 10 to 20 parts by weight of an inorganic filler, 5 to 10 parts by weight of a pigment, and 2 to 5 parts by weight of an additive; and the curing agent including 60 to 80 parts by weight of a rubber-modified epoxy resin, 20 to 40 parts by weight of a polyol, 10 to 30 parts by weight of the thiol-modified epoxy intermediate, and 4 to 10 parts by weight of an additive, with respect to 100 parts by weight of an isocyanate mixture.

In the present invention, the thiol-modified epoxy intermediate is an intermediate prepared by reacting an ethylene glycol-based polyfunctional epoxy resin, a liquid epoxy resin, and a thiol compound having at least two terminal thiol groups, and has a dense network structure, resulting in excellent strength and excellent adhesion to a substrate, and provides a function excellent in fast-curing properties even under low temperature conditions. Thus, in the present invention, it is possible to provide an eco-friendly adhesive coating agent composition that exhibits high adhesion properties and fast-curing properties by including the thiol-modified epoxy intermediate in both the main material and the curing agent.

In this case, the thiol compound is a compound having at least two thiol groups per molecule. Preferably, the thiol compound includes at least one selected from 1,2-ethanedithiol, 1,4-butanedithiol, 1,6-hexanedithiol, 2,2'-thiodiethanethiol, 2,2'-(ethylenedioxy) diethanethiol (EDDET), ethane-1,2-diyl bis(3-mercaptopropanoate), hexa(ethylene glycol) dithiol, tetra(ethylene glycol) dithiol, 1,16-hexadecanedithiol, benzene-1,2-dithiol, benzene-1,3-dithiol, benzene-1,4-dithiol, biphenyl-4,4'-dithiol, 1,4-benzenedimethanethiol, and 2-mercaptoethyl ether.

Preferably, the thiol-modified epoxy intermediate is prepared by reacting 50 to 60 parts by weight of an ethylene glycol-based polyfunctional epoxy resin, 20 to 25 parts by weight of a liquid epoxy resin, and 18 to 25 parts by weight of a thiol compound having at least two terminal thiol groups. More preferably, the thiol-modified epoxy intermediate is prepared by reacting an ethylene glycol-based polyfunctional epoxy resin having an epoxy equivalent weight of 100 to 400 g/eq, a liquid epoxy resin, and a thiol compound having at least two terminal thiol groups.

In one embodiment of the present invention, poly(ethylene glycol) diglycidyl ether which is a polyfunctional epoxy resin having an ethylene glycol-based backbone, 4,4'-isopropylidenediphenol-epichlorohydrin copolymer which is a liquid epoxy resin, and 2,2'-(ethylenedioxy) diethanethiol which is a thiol compound are reacted and synthesized in a solvent-free environment, thereby preparing the thiol-modified epoxy intermediate for a structural adhesive.

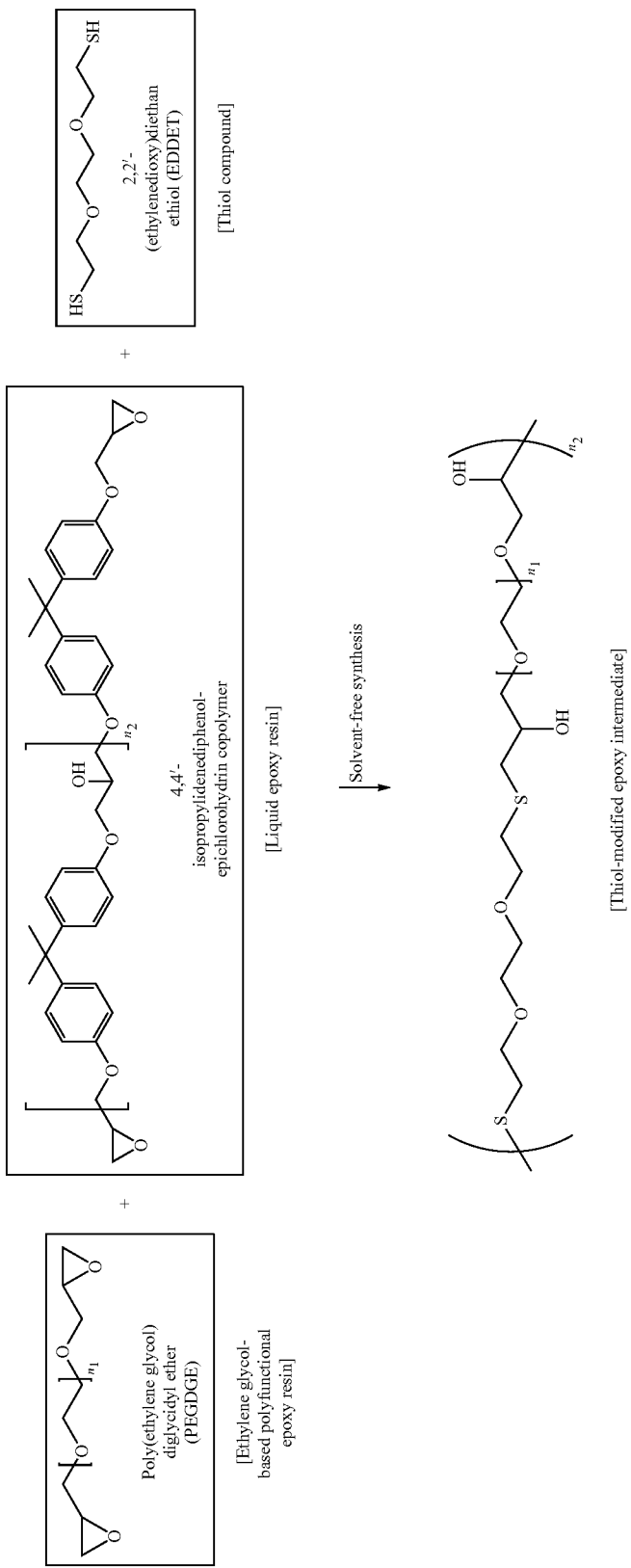

As described above, the thiol-modified epoxy intermediate according to the present invention is applied to a structural adhesive; participates in a final curing reaction to form a solid epoxy curing structure, thereby improving mechanical properties of a coating film as well as durability; and has fast-curing properties and improved mechanical properties imparted by the thiol compound.

In addition, in the present invention, the main material includes polyoxypropyleneamine, a cross-linking agent, a thiol-modified epoxy intermediate, an inorganic filler, a pigment, and an additive. That is, the present invention is characterized in that particularly the thiol-modified epoxy intermediate is included in both the main material and the curing agent. The thiol-modified epoxy intermediate included in the main material serves to improve reaction rate and improve adhesion performance. In this case, when the amount thereof is less than 10 parts by weight, it is difficult to improve reaction rate and thus is difficult to exhibit fast-curing properties. On the other hand, when the amount thereof is greater than 30 parts by weight, curing rate is fast and thus adhesion properties are lowered. Thus, preferably, the thiol-modified epoxy intermediate is included in an amount of 10 to 30 parts by weight.

The polyoxypropyleneamine in the main material is included to impart elasticity to the coating film and improve mechanical properties. The polyoxypropyleneamine is characterized by being at least one compound selected from polyoxypropylenediamine or polyoxypropylenetriamine having a weight average molecular weight of 200 to 5000. More preferably, the polyoxypropyleneamine is characterized by being obtained by mixing 20 to 30 parts by weight of the polyoxypropylenediamine and 5 to 10 parts by weight of the polyoxypropylenetriamine.

In this case, the amount of the polyoxypropyleneamine is preferably 25 to 40 parts by weight. When the amount of the polyoxypropyleneamine is less than 25 parts by weight, it is undesirable because elongation of a coating material is lowered. On the other hand, when the amount thereof is greater than 40 parts by weight, it is undesirable because wear resistance is lowered, resulting in a decrease in durability, and the amount of other components relatively decreases, thereby making it difficult to prepare a desired coating material. As a specific example of the polyoxypropyleneamine, the Jeffamine series from Huntsman Company (trade name: Jeffamine T-5000, Jeffamine D-230, Jeffamine D-400, Jeffamine D-2000) are preferably used.

Further, the cross-linking agent in the main material is included to improve mechanical properties and reaction rate, and an aromatic or alicyclic amine compound used as a chain extender may be used. It is preferable to use difunctional diamines having low reactivity. Of these, at least one selected from diethyltoluenediamine and polyetheramine is preferably used. In the present invention, the amount of the cross-linking agent is preferably 20 to 30 parts by weight. When the amount of the cross-linking agent is less than 20 parts by weight, it is undesirable because the effect as a chain extender is insignificant and it is difficult to expect an improvement in mechanical properties. On the other hand, when the amount thereof is greater than 30 parts by weight, it is undesirable because excessive hardness improvement and elongation decrease are caused.

Further, the inorganic filler in the main material is used to impart anti-corrosion and anti-rust effects while improving dimensional stability and impact resistance of the coating agent composition, and additionally may serve to improve heat resistance, alkaline resistance, acid resistance, and chemical resistance. For this purpose, any filler that is commonly used in the art may be used. Preferably, core-shell rubber powder, PU beads, ceramic powder-based alumina, silica, zirconium, zinc dust, zinc phosphate, calcium carbonate, barium sulfate, and talc are used alone or as a mixture. The components to be added may be appropriately selected and used depending on application fields.

In one embodiment of the present invention, core-shell rubber powder and zinc phosphate are used to effectively impart anti-corrosion and anti-rust properties, and impact resistance. Preferably, the amount of the inorganic filler is 10 to 20 parts by weight. When the amount of the inorganic filler is less than 10 parts by weight, it is undesirable because anti-corrosion and anti-rust properties, and impact resistance are lowered. On the other hand, when the amount thereof is greater than 20 parts by weight, the amount of the resin is relatively small and thus there is a problem in that adhesion to the coating material is lowered.

Further, the pigment in the main material is to provide a color, and the amount thereof is preferably 5 to 10 parts by weight. However, the amount thereof may be appropriately controlled depending on the needs of a consumer or the needs of a manufacturer, without being necessarily limited to the above range.

Further, as the additive in the main material, a UV stabilizer, defoamer, and the like, which are usually used in the composition of the coating material for painting may be used alone or in mixture in a range of 2 to 5 parts by weight.

In this case, the UV stabilizer is added to prevent premature deterioration due to ultraviolet light, and the amount thereof is preferably 1 to 3 parts by weight. When the amount of the UV stabilizer is less than 1 part by weight, the effect of preventing premature deterioration due to ultraviolet light is lowered. On the other hand, when the amount of the UV stabilizer is greater than 3 parts by weight, the effect of preventing premature deterioration due to ultraviolet light is no longer improved, while there is a possibility that other physical properties of the coating agent composition may be lowered. As a specific example of the UV stabilizer, Tinuvin 571 (available from Ciba Company) is preferably used.

Further, the defoamer is added to prevent generation of bubbles, and the amount thereof is 1 to 2 parts by weight. The defoamer may be used by selecting at least one from a mineral oil-based defoamer, a silicone-based defoamer, and a silicone-fee polymeric defoamer. For example, BYK-054 from BYK Company, a silicone-free polymeric defoamer, may be used.

Further, in the present invention, the curing agent includes an isocyanate mixture, a rubber-modified epoxy resin, a polyol, a thiol-modified epoxy intermediate, and an additive. In particular, the thiol-modified epoxy intermediate included in the curing agent serves to improve reaction rate and improve adhesion performance. Additionally, the thiol-modified epoxy intermediate participates in a final curing reaction to form a solid epoxy curing structure, thereby serving to improve mechanical properties and durability of the coating film. In this case, when the amount there of is less than 10 parts by weight, it is difficult to improve reaction rate and thus is difficult to exhibit fast-curing properties. On the other hand, when the amount thereof is greater than 30 parts by weight, curing rate is fast and thus adhesion properties are lowered, resulting in a reduction in durability. Thus, preferably, the thiol-modified epoxy intermediate is included in an amount of 10 to 30 parts by weight.

Further, the isocyanate mixture in the curing agent is included to improve reactivity and physical properties of the coating film. As the isocyanate mixture, at least two selected from methylene diphenyl diisocyanate (MDI), toluene diisocyanate (TDI), hexamethylene diisocyanate (HDI), hexamethylene diisocyanate trimer (HDT), isophorone diisocyanate (IPDI), and cyclohexylmethane diisocyanate (H12MDI) may be used in mixture.

The curing agent is obtained by mixing 20 to 40 parts by weight of the polyol having a hydroxyl group, 60 to 80 parts by weight of the rubber-modified epoxy resin, 10 to 30 parts by weight of the thiol-modified epoxy intermediate, and 4 to 10 parts by weight of the additive with respect to 100 parts by weight of the isocyanate mixture, and the NCO amount is preferably 5 to 10% by weight when maintained at 80 to 120° C. for 4 to 6 hours.

The polyol is not particularly limited, but may be at least one mixture selected from the group consisting of polyethylene glycol, polypropylene glycol, polybutylene glycol, and polyisoprene glycol.

Further, the rubber-modified epoxy resin is obtained by polymerizing rubber and an epoxy resin to minimizes unreacted groups of the rubber, which is a linear polymer having some unreacted groups. Thus, the rubber-modified epoxy resin is included in the curing agent to exhibit improved curing reactivity and improve mechanical properties such as adhesion properties and heat resistance of the composition. Preferably, the amount thereof is 60 to 80 parts by weight with respect to 100 parts by weight of the isocyanate mixture in order to improve adhesion properties and heat resistance while improving curing reactivity. In this case, the rubber-modified epoxy resin is preferably an epoxy resin modified with rubber, selected from the group consisting of acrylonitrile-butadiene rubber (NBR), carboxyl terminated butadiene acrylonitrile (CTBN) rubber, epoxy terminated butadiene acrylonitrile (ETBN), and amine terminated butadiene acrylonitrile (ATBN) rubber.

The rubber-modified epoxy resin preferably has an epoxy equivalent weight of 100 to 300 g/eq and a weight average molecular weight (Mw) of 100 to 1000. This is because when the rubber-modified epoxy resin having an equivalent weight and a weight average molecular weight in the above range is used, mechanical properties such as adhesion properties and heat resistance of the composition may be further improved.

Further, the curing agent may further include at least one additive, for example, a curing accelerator, a silane coupling agent, a dispersant, a defoamer, an anti-settling agent, a pigment, a toughener, or the like. The type and amount of the additive may be appropriately selected. Preferably, the amount thereof is 4 to 10 parts by weight with respect to 100 parts by weight of the isocyanate mixture.

For example, as a toughener for improving mechanical properties such as tensile strength, 2 to 5 parts by weight of terminated butadiene acrylonitrile copolymer (CTBN), amine terminated butadiene acrylonitrile copolymer (ATBN), and the like may be included. In one embodiment of the present invention, 2 parts by weight of the CTBN is added.

As another example, a silane coupling agent may be included as the additive. The silane coupling agent has a structure in which four chains are bonded to a silicon atom, and at least one chain includes an alkoxy group, and at least one chain includes a functional group such as a mercapto group, a vinyl group, an epoxy group, an amino group, a methacryl group, a phenyl group, or the like. The silane coupling agent serves to improve compatibility between components while improving bonding force between an adherend surface and the composition. Preferably, the amount thereof is 2 to 5 parts by weight. This is because when the amount thereof is less than 2 parts by weight, adhesion between the coating agent composition and the adherend surface is no longer significantly improved, and when the amount thereof is greater than 5 parts by weight, there is a possibility that other physical properties of the composition may be deteriorated. In one embodiment of the present invention, 2 parts by weight of the silane coupling agent is added.

As described above, the present invention relates to the eco-friendly adhesive coating agent composition that is applicable to steel pipes by exhibiting fast-curing properties and high adhesion properties by the inclusion of the thiol-modified epoxy resin, which is an epoxy resin for a structural adhesive, in the main material and the curing agent, and by polyurea bonds. Thus, the adhesive coating agent composition according to the present invention is obtained by mixing the main material and the curing agent and is characterized in that depending on the type of polymer and the type and component of cross-linking agent and hardener in a main material mixture, gelation time varies and the shape of a polyurea coating material is distinguished.

Hereinafter, the present invention will be described in detail by way of examples, but the scope of the present invention is not limited to the following examples.

EXAMPLE 1

Preparation of Adhesive Coating Agent Composition

Synthesis of Thiol-Modified Epoxy Intermediate

An intermediate was synthesized by the following process. Raw materials used are shown in Table 1 below.

1) Poly(ethylene glycol) diglycidyl ether and a liquid epoxy resin were placed in a reactor and then the reactor was filled with nitrogen, followed by stirring for 30 minutes to 1 hour.

2) After heating to 70° C., 2,2'-(ethylenedioxy) diethanethiol was added dropwise for 3 hours, and after heating to 80 to 100° C., a reaction was maintained for 3 to 5 hours.

3) Then, after cooling to 40° C., the reaction was terminated when the epoxy equivalent weight was 140 to 160 g/eq.

TABLE 1

| Raw material name | Intermediate 1 | Intermediate 2 | Molecular weight/ equivalent weight |
|---|---|---|---|
| Poly(ethylene glycol) diglycidyl ether (PEGDGE) | 50~60 (54.50 g) | 50~60 (56.06 g) | 400/200 |
| 4,4'-isopropylidenediphenol-epichlorohydrin copolymer | 20~25 (21.84 g) | 20~25 (22.47 g) | 374/187 |
| 2,2'-(ethylenedioxy)diethanethiol (EDDET) | 18~25 (23.66 g) | 18~25 (21.47 g) | 182.3/91.15 |
| Total | 100.00 g | 100.00 g | |

A thiol-modified epoxy intermediate obtained through synthesis was analyzed for functional groups present in a molecule using a Fourier-transform infrared spectrometer (FT-IR). Analysis results are shown in FIG. 1, and peaks for each functional group are shown in Table 2 below.

TABLE 2

| Functional group | Peak (cm$^{-1}$) |
|---|---|
| —OH | 3580~3650 |
| —CH | 2850~2960 |
| —SH | 2500~2600 |
| C=O | 1670~1780 |
| C=C | 1580~1680 |
| C—H | 1230 |
| Epoxide ring | 815~950 |

Referring to this, it can be seen that an epoxide ring was formed as a strong peak was observed at 815 to 950 cm-1, and that a thiol group was observed at 2500 to 2600 cm-1, a —OH group was observed at 3580 to 3650 cm-1, and others bonds were also observed. Thus, it can be seen that an epoxy intermediate represented by the following formula 1 was produced.

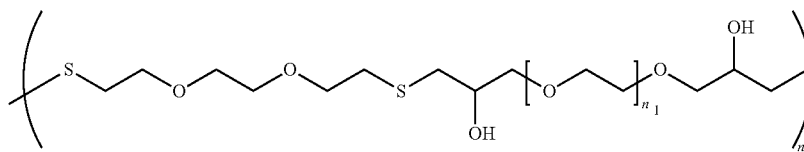

<Formula 1>

Preparation of Main Material

A main material composition was prepared by the following process. Raw materials used are shown in Table 3 below.

1) Polyoxypropyleneamine (27 g of polyamine 2000D, 8 g of polyamine 5000T) was introduced into a four-necked flask, a cross-linking agent (10 g of DETDA, 8 g of polyamine T403, 5 g of polyamine 230D) was introduced into the flask, the flask was filled with nitrogen, and then a reaction product was heated to 50 to 70° C., followed by stirring for 30 minutes to 1 hour.

2) When the reaction product was sufficiently stirred, 17 g of an intermediate 1 (thiol-modified epoxy intermediate) prepared above was added dropwise for 1 hour, followed by aging for 3 to 5 hours. Sampling for the reaction product was carried out, and a reaction was terminated when the amine value was 200 to 300 mg KOH/g.

3) After cooling the reaction product to 40° C., a functional extender pigment to impart anti-corrosion and anti-rust, and impact resistance improvement functions was introduced into the flask, and then a color pigment and an additive were quantitated and introduced into the flask, followed by high-speed stirring for 30 minutes to 1 hour, thereby obtaining a homogeneous mixture.

Preparation of Curing Agent

A curing agent composition was prepared by the following process. Raw materials used are shown in Table 3 below.

1) First, rubber dispersed type modified epoxy, polypropylene glycol, and an intermediate 2 (thiol-modified epoxy intermediate) prepared above were introduced into a four-necked flask, and then the flask was filled with nitrogen, followed by heating to 60° C., and stirring for 30 minutes to 1 hour.

2) After adding the isocyanate mixture dropwise for 1 hour, followed by heating to 100° C., a reaction was maintained for 5 hours. Sampling for a reaction product was carried out, and the reaction was terminated when NCO (%)=5 to 8(%).

3) An additive was quantitated and introduced into the flask, followed by stirring for 1 hour at high speed, thereby obtaining a homogeneous curing agent.

EXAMPLES 2 to 3 and COMPARATIVE EXAMPLES 1 to 2

Examples 2 to 3 and Comparative Examples 1 to 2 were prepared in the same manner as in Example 1, except that the mixing ratio was varied.

In Table 3 below, the mixing ratios of Examples 1 to 3 and Comparative Examples 1 to 2 are summarized and shown.

TABLE 3

| Classification (raw material name) | | | Example 1 | Example 2 | Example 3 | Comparative Example 1 | Comparative Example 2 |
|---|---|---|---|---|---|---|---|
| Main material | Polyoxypropyleneamine | Polyamine 2000D | 27 | 22 | 29 | 27 | 25 |
| | | Polyamine 5000T | 8 | 10 | 5 | 8 | 6 |
| | Cross-linking agent | DETDA | 10 | 15 | 8 | 18 | 10 |
| | | Polyamine T403 | 8 | 12 | 5 | 7 | 7 |
| | | Polyamine 230D | 5 | — | 10 | 5 | 7 |
| | Thiol-modified epoxy intermediate 1 | | 17 | 11 | 23 | 5 | 20 |
| | Inorganic filler | Core-shell rubber powder | 10 | 12 | 6 | 15 | 7 |
| | | Zinc phosphate | 5 | 8 | 4 | 5 | 8 |

TABLE 3-continued

|  | Classification (raw material name) |  | Example 1 | Example 2 | Example 3 | Comparative Example 1 | Comparative Example 2 |
|---|---|---|---|---|---|---|---|
|  | Color pigment |  | 7 | 7 | 7 | 7 | 7 |
|  | Additive | UV stabilizer | 2 | 2 | 2 | 2 | 2 |
|  |  | Defoamer | 1 | 1 | 1 | 1 | 1 |
|  | Total |  | 100 | 100 | 100 | 100 | 100 |
| Curing agent | Isocyanate mixture | HDT | 38.6 | 42.2 | 32.8 | 40.7 | 35.9 |
|  |  | IPDI | 15.9 | 25.6 | 20.2 | 19.5 | 23.1 |
|  |  | H12MDI | 45.5 | 32.2 | 47.0 | 39.8 | 41.0 |
|  | Total |  | \multicolumn{5}{c}{With respect to 100 parts by weight} |
|  | Rubber dispersed type modified epoxy |  | 68.0 | 66.0 | 72.0 | 68.0 | 70.0 |
|  | Polypropylene glycol (GP-4000) |  | 34.0 | 28.0 | 30.0 | 32.0 | 34.0 |
|  | Thiol-modified epoxy intermediate 2 |  | 22.9 | 20.5 | 21.0 | 14.6 | 8.0 |
|  | Additive | CTBN | 2 | 2 | 2 | 2 | 2 |
|  |  | Silane coupling agent | 2 | 2 | 2 | 2 | 2 |

Test Example 1

Dry-Through Time Test

A dry-through time test was carried out according to KS M 5000 standards, and a composition of each of Examples 1 to 3 and Comparative Examples 1 to 2 was coated on a steel sheet having a size of 300×100×0.2 (mm) to a recommended film thickness, and then the degree of stain was observed to check a dry-through state (within 24 hours). In detail, dry-through refers to a state in which there is no loosening, wrinkling, or other distortion of a coating film when an operator presses a thumb on the film, exerting the maximum pressure while simultaneously twisting the thumb through an angle of 90° when an operator's arm is kept in a vertical line from the wrist to the shoulder. Based on this, it was determined whether drying was abnormal.

Results of dry-through of a coating film were represented as '○:good', 'Δ:normal (slight wrinkles)', and 'x: bad (many wrinkles)', and the results are shown in Table 4 below.

TABLE 4

| Test item | Example 1 | Example 2 | Example 3 | Comparative Example 1 | Comparative Example 2 |
|---|---|---|---|---|---|
| Dry-through | ○ | ○ | ○ | x | Δ |

As shown in Table 4, it was seen that in Examples 1 to 3, dry-through was stably made by fast curing, in Comparative Example 1, wrinkles were generated even after 30 minutes, and in Comparative Example 2, slight wrinkles were generated. This means that Comparative Examples 1 to 2 had a low amount of the thiol-modified epoxy intermediate in the main material and the curing agent, and thus curing rate was not improved.

Test Example 2

Adhesion Strength Test

An adhesion strength test was carried out according to ASTM D4541 standard, and the composition of each of Examples 1 to 3 and Comparative Examples 1 to 2 was coated on a steel sheet having a size of 300×100×0.2 (mm), thereby preparing a specimen.

Results of adhesion strength of a coating film was represented as '○:good' when a result was superior to a reference value, 'Δ:normal' when a result was close to the reference value, and 'x:bad' when a result was less than the reference value, and the results are shown in Table 5 below.

TABLE 5

| Test item | Example 1 | Example 2 | Example 3 | Comparative Example 1 | Comparative Example 2 |
|---|---|---|---|---|---|
| Adhesion strength | ○ | ○ | ○ | Δ | Δ |

As shown in Table 5, it was seen that Examples 1 to 3 exhibited excellent adhesion strength, while in Comparative Examples 1 and 2, adhesion strength was not improved. This means that in Comparative Example 1 had a low amount of the thiol-modified epoxy intermediate in the main material and Comparative Example 2 had a low amount of the thiol-modified epoxy intermediate in the curing agent, and thus adhesion properties were not improved. That is, it was seen that the thiol-modified epoxy intermediate had to be appropriately included in both the main material and the curing agent in order to exhibit high adhesion properties.

Test Example 3

Dissolution Test

A dissolution test was carried out according to a process test method for sanitary safety standards of materials and products for water: 2018 (guide line No. 2018-172 issued by the Korean Ministry of Environment), and the composition of each of Examples 1 to 3 and Comparative Examples 1 to 2 was coated on a glass sheet, thereby preparing a specimen.

Results of the dissolution test of a coating film were represented by '○:good' and 'x:bad', and the results are shown in Table 6 below.

TABLE 6

| Test item | Example 1 | Example 2 | Example 3 | Comparative Example 1 | Comparative Example 2 |
|---|---|---|---|---|---|
| Dissolution test | ○ | ○ | ○ | ○ | ○ |

As shown in Table 6, it was seen that there were no abnormalities in the dissolution test in both Examples 1 and 3 and Comparative Examples 1 and 2, and thus it was seen that the composition according to the present invention was applicable to water supply materials, steel pipes, and the like.

Test Example 4

Test for Four Heavy Metals

A test for four heavy metals (Pb, Cd, Cr6+, Hg) was carried out according to KS M ISO 3856-1, KS M ISO 3856-4, KS M ISO 3856-5, and KS M ISO 3856-7. For the composition of each of Examples 1 to 3 and Comparative Examples 1 to 2, it was checked whether four heavy metals were detected. The results are shown in Table 7 below.

TABLE 7

| Test item | Example 1 | Example 2 | Example 3 | Comparative Example 1 | Comparative Example 2 | Test method |
|---|---|---|---|---|---|---|
| Pb | Not detected | Not detected | Not detected | Not detected | Not detected | KS M ISO 3856-1 |
| Cd | Not detected | Not detected | Not detected | Not detected | Not detected | KS M ISO 3856-4 |
| $Cr^{6+}$ | Not detected | Not detected | Not detected | Not detected | Not detected | KS M ISO 3856-5 |

As shown in Table 7, it was seen that there were no abnormalities in both Examples 1 to 3 and Comparative Examples 1 to 2, and thus it was seen that the composition according to the present invention was an eco-friendly product applicable to water supply materials, steel pipes, and the like because four heavy metals were not detected.

As described above, the adhesive coating agent composition according to the present invention is applicable to water supply materials, steel pipes, and the like because fast-curing properties and high adhesion properties are exhibited by the inclusion of the thiol-modified epoxy resin, which is an epoxy resin for a structural adhesive, in the main material and the curing agent, and by polyurea bonds, and because no harmful substances such as heavy metals were dissolved.

Although the invention is described with reference to specific details, those skilled in the art will appreciate that modifications and variations can be made without departing from the essential characteristics of the present invention. Thus, exemplary embodiments disclosed herein are only for illustrative purposes and are not intended to limit the spirit of the present invention. Thus, the scope of the present invention is not limited by these embodiments. It is thus well known to those skilled in that art that the scope of the invention should be determined on the basis of the descriptions in the appended claims, and all equivalents thereof should belong to the scope of the invention.

What is claimed is:

1. An eco-friendly adhesive coating agent composition having high adhesion properties and fast-curing properties by using a thiol-modified epoxy intermediate, the composition comprising:
   a main material including 25 to 40 parts by weight of polyoxypropyleneamine, 20 to 30 parts by weight of a cross-linking agent, 10 to 30 parts by weight of the thiol-modified epoxy intermediate, 10 to 20 parts by weight of an inorganic filler, 5 to 10 parts by weight of a pigment, and 2 to 5 parts by weight of an additive; and
   a curing agent including 60 to 80 parts by weight of a rubber-modified epoxy resin, 20 to 40 parts by weight of a polyol, 10 to 30 parts by weight of the thiol-modified epoxy intermediate, and 4 to 10 parts by weight of an additive, with respect to 100 parts by weight of an isocyanate mixture,
   wherein the main material and the curing agent are mixed in a weight ratio of 1 to 10:1.

2. The composition of claim 1, wherein the thiol-modified epoxy intermediate is prepared by reacting 50 to 60 parts by weight of an ethylene glycol-based polyfunctional epoxy resin, 20 to 25 parts by weight of a liquid epoxy resin, and 18 to 25 parts by weight of a thiol compound having at least two terminal thiol groups.

3. The composition of claim 2, wherein the thiol-modified epoxy intermediate has the following formula 1:

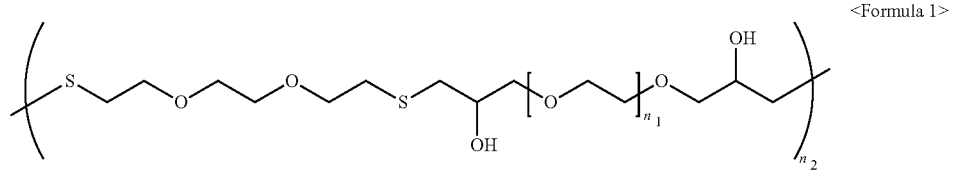

<Formula 1> wherein, n1 and n2 are 1 to 100 respectively in the above formula.

4. The composition of claim 2, wherein the thiol compound includes at least one selected from 1,2-ethanedithiol, 1,4-butanedithiol, 1,6-hexanedithiol, 2,2'-thiodiethanethiol, 2,2'-(ethylenedioxy) diethanethiol (EDDET), ethane-1,2-diyl bis(3-mercaptopropanoate), hexa(ethylene glycol) dithiol, tetra(ethylene glycol) dithiol, 1,16-hexadecanedithiol, benzene-1,2-dithiol, benzene-1,3-dithiol, benzene-1,4-dithiol, biphenyl-4,4'-dithiol, 1,4-benzenedimethanethiol, and 2-mercaptoethyl ether.

5. The composition of claim 1, wherein the composition is a composition for steel pipe coating.

* * * * *